United States Patent
Suzuki

(10) Patent No.: US 7,357,050 B2
(45) Date of Patent: Apr. 15, 2008

(54) LEVER APPARATUS FOR VEHICLES

(75) Inventor: Takafumi Suzuki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 486 days.

(21) Appl. No.: 10/617,139

(22) Filed: Jul. 11, 2003

(65) Prior Publication Data

US 2004/0074047 A1    Apr. 22, 2004

(30) Foreign Application Priority Data

Jul. 15, 2002    (JP) .......................... P. 2002-205534

(51) Int. Cl.
G05G 1/04 (2006.01)
B60K 20/00 (2006.01)

(52) U.S. Cl. ..................... 74/523; 74/473.31

(58) Field of Classification Search ................. 74/523, 74/524, 543–548, 473.3, 473.31–473.33, 74/550, 551, 473.24, 473.25, 473.27, 484 R; 200/61.34, 61.3, 61.35
See application file for complete search history.

(56) References Cited

U.S. PATENT DOCUMENTS

| 2,193,230 | A | * | 3/1940 | Ferguson | ................... 74/473.1 |
| 2,342,402 | A | * | 2/1944 | Jakeway | ...................... 292/347 |
| 2,433,993 | A | * | 1/1948 | Jakeway et al. | ............. 292/347 |
| 3,513,716 | A | * | 5/1970 | Evans | ...................... 74/473.27 |
| 5,646,384 | A | * | 7/1997 | Noro et al. | ................. 200/61.3 |
| 6,194,676 | B1 | * | 2/2001 | Takahashi et al. | ........ 200/61.34 |
| 6,237,437 | B1 | * | 5/2001 | Takahashi | ................. 74/484 R |
| 6,333,475 | B1 | * | 12/2001 | Kontani | .................... 200/61.34 |
| 6,584,870 | B2 | * | 7/2003 | Nishimura et al. | ......... 74/473.3 |
| 6,677,543 | B2 | * | 1/2004 | Takahashi et al. | .......... 200/61.3 |
| 7,038,580 | B2 | * | 5/2006 | Takahashi | .................... 340/475 |

FOREIGN PATENT DOCUMENTS

EP    0647801    * 10/1994

* cited by examiner

Primary Examiner—Richard Ridley
Assistant Examiner—James Pilkington
(74) Attorney, Agent, or Firm—Morgan, Lewis & Bockius LLP

(57) ABSTRACT

In the lever apparatus, a cover part (19) including a spherical-shaped outer surface and two thickness-reducing recessed portions (18) formed on the inner surface side thereof is disposed on the base end portion of a lever upper (12) and fitting recessed portions (21), instead of the rotatably-supporting shaft portions which are used in the conventional lever apparatus, are formed in the mounting part (20) of the lever upper. When molding the lever upper, molds for molding the thickness-reducing recessed portions can be slided in the projecting direction of the mounting part, thereby being able to facilitate the manufacture of the lever upper and thus lever (11).

4 Claims, 4 Drawing Sheets

LEVER APPARATUS FOR VEHICLES

BACKGROUND OF THE INVENTION

The present invention relates to a lever apparatus for use in a vehicle structured such that the base end portion of a lever is rotatably mounted on a lever support member.

In a lever apparatus for use in a vehicle, generally, there is employed a structure in which two rotatably-supporting shaft portions are respectively provided on and from the two mutually opposing portions of the mounting portion of the base end portion of a lever made of synthetic resin, two fitting hole portions (or fitting recessed portions) respectively corresponding to their associated shaft portions are formed in a lever support member, and the shaft portions are respectively fitted into their associated fitting hole portions in a rotatable manner.

By the way, in this type of lever apparatus, it is desired that a cover part including a spherical-shaped outer surface should be disposed on the base end portion of the lever. To meet this desire, it is expected that there is employed such a structure as shown in FIG. 6. That is, a cover part 2 including a spherical-shaped outer surface is disposed on the base end portion of a lever land two rotatably-supporting shaft portions 4 are respectively provided on and projected from the two mutually opposing side portions of a mounting part 3 projected from the interior of the cover portion 2. In this case, it is necessary to form two recessed portions 5 for thickness reduction in the inner surface side of the cover part 2 in order to prevent a dent (a hollow) from being formed in the outer surface of the cover part 2.

However, in the manufacture of the lever 1 having the above structure, there arises the following problem. That is, in the molding operation for molding the lever 1, to form the thickness-reducing recessed portions 5 of the cover part 2, it is necessary to slide a molding mold for molding the thickness-reducing recessed portions 5 in the arrow mark A1 direction (in the projecting direction of the mounting part 3) when the molds of a mold structure are opened. But, since the shafts portions 4 are projected in the neighboring portions of the openings of the thickness-reducing recessed portions 4, it is impossible to slide the molding mold for molding the thickness-reducing recessed portions in the arrow mark A1 direction. Due to this, it is difficult to manufacture the lever 1 having such structure.

SUMMARY OF THE INVENTION

The present invention aims at eliminating the above drawback found in the conventional lever apparatus. Accordingly, it is an object of the invention to provide a lever apparatus for use in a vehicle which not only has a structure that a cover part including a spherical-shaped outer surface and two thickness-reducing recessed portions on the inner surface side thereof is formed in the base end portion of a lever but also can facilitate the manufacture of the lever.

In order to solve the aforesaid object, the invention is characterized by having the following arrangement.

Aspect 1. A lever apparatus for a vehicle comprising:
a lever;
a cover part disposed on a based end portion of the lever, which includes a spherical-shaped outer surface and a thickness-reducing recessed portion formed on an inner surface side thereof;
a mounting part projecting from the inner surface of the cover part;
a pair of fitting recessed portions formed in opposed side portions of the mounting part; and
a lever support portion including a pair of shaft portions with which the pair of fitting recessed portion are respectively fitted.

Aspect 2. The lever apparatus according to the aspect 1, wherein a pair of openings are respectively formed in peripheries of the associated shaft portions.

Aspect 3. The lever apparatus according to the aspect 2, wherein an inserting opening to which the mounting part is inserted is formed in the lever support portion, and the pair of shaft portions project toward the inserting opening.

Aspect 4. The lever apparatus according to the aspect 3, wherein when the mounting part is inserted into the lever support portion, the pair of shaft portions abut to the mounting part and are elastically deformed outwardly.

DETAILED DESCRIPTION OF PREFERRED EMBODIMENTS

Now, description will be given below of an embodiment of a lever apparatus according to the invention with reference to FIGS. 1 to 5.

Figure 2:
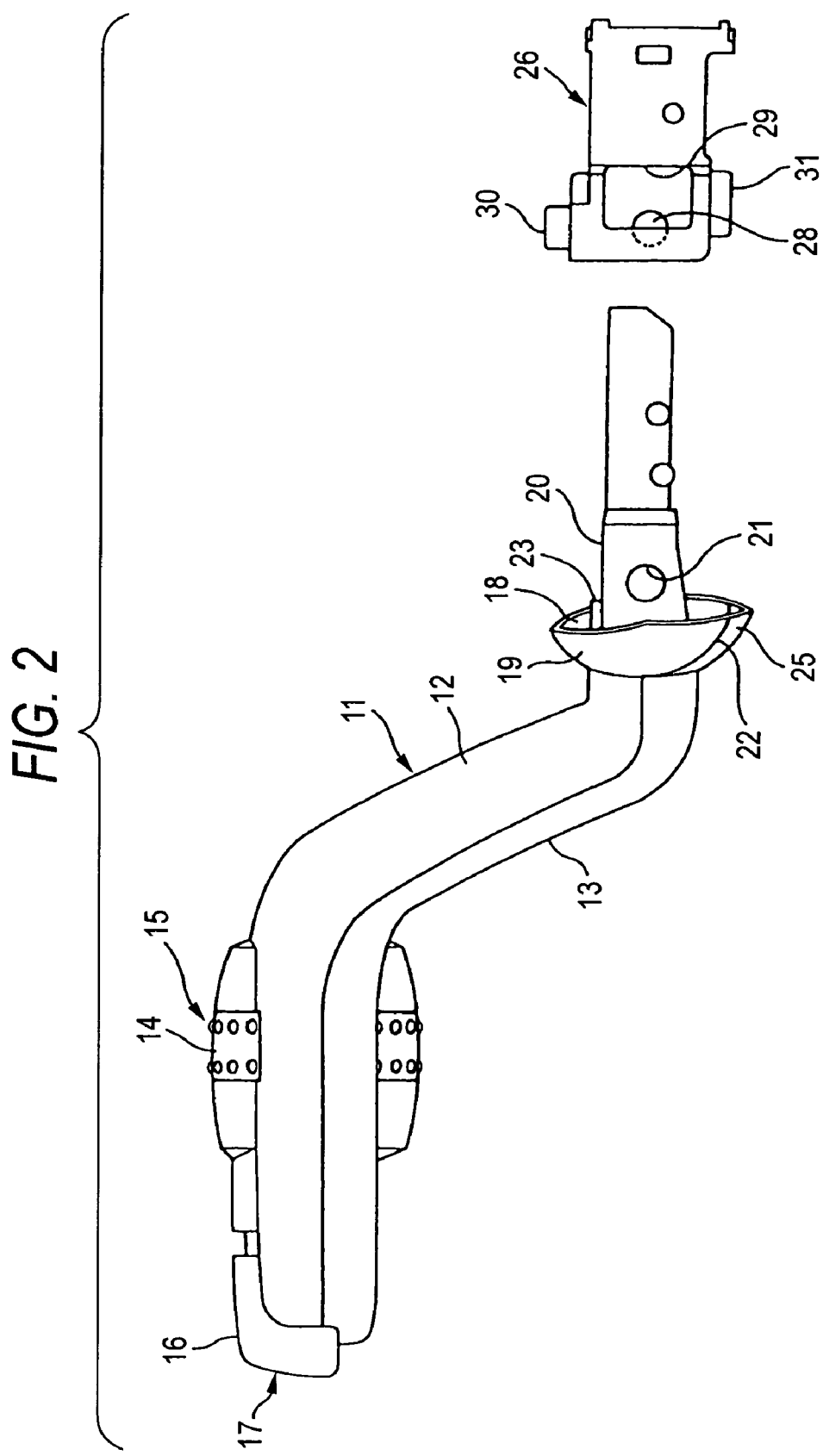
FIG. 2 is a side view of a lever and a lever support member.

Firstly, FIG. 2 shows the whole structure of a lever apparatus according to the present embodiment. This lever apparatus is to be mounted on the steering column portion of a car (vehicle) (not shown). In this lever apparatus 11, a lever upper 12 and a lever lower 13 respectively made of synthetic resin and extending in the longitudinal direction of the lever apparatus 11 are disposed opposed to each other and are fitted with each other, thereby providing a hollow structure; and, on the leading end portion side thereof (in FIG. 2 on the left side), there are disposed a rotary switch 15 which can be operated by a rotary knob 14, and a push button switch 17 to be operated by a push button 16.

Figure 1:
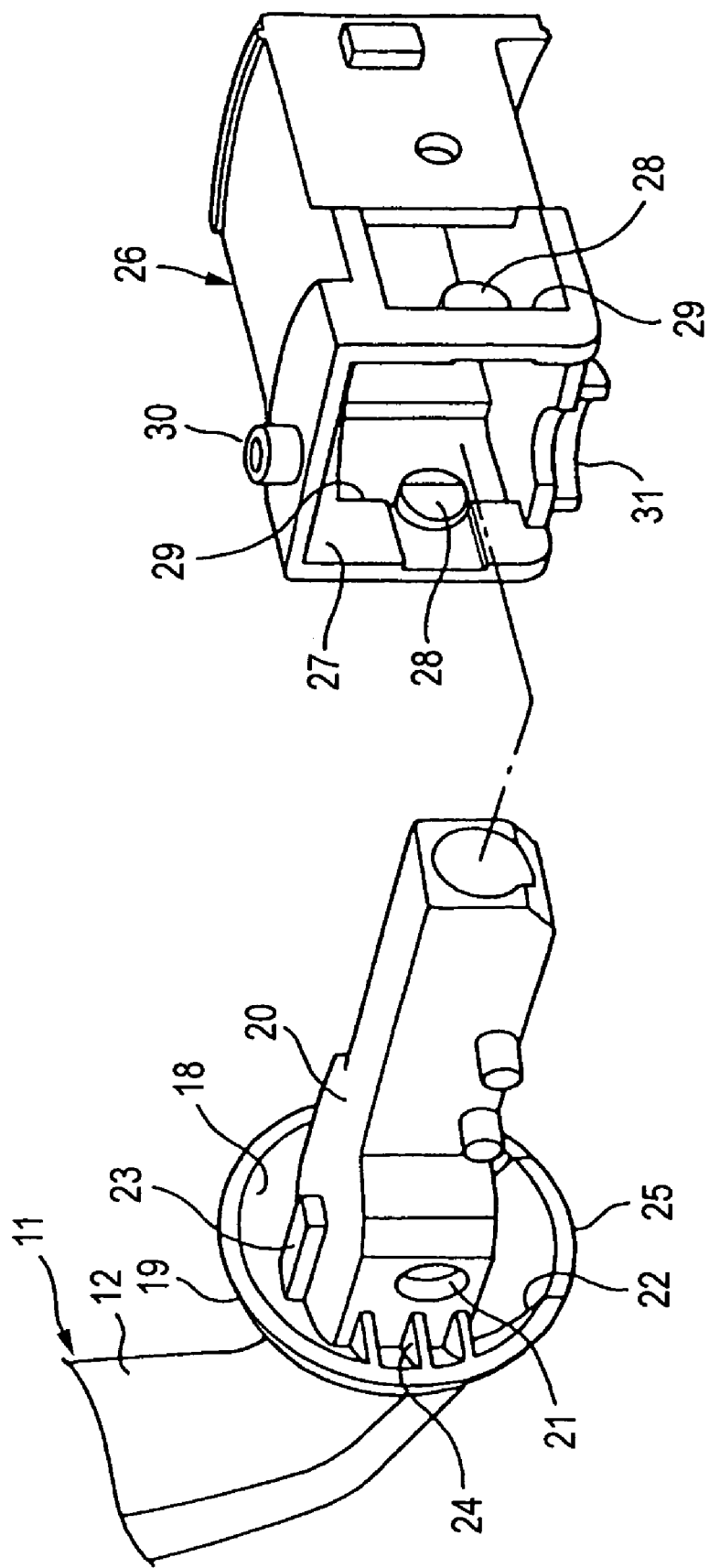
FIG. 1 is an exploded perspective view of the main portions of an embodiment of a lever apparatus according to the invention.
Figure 3:
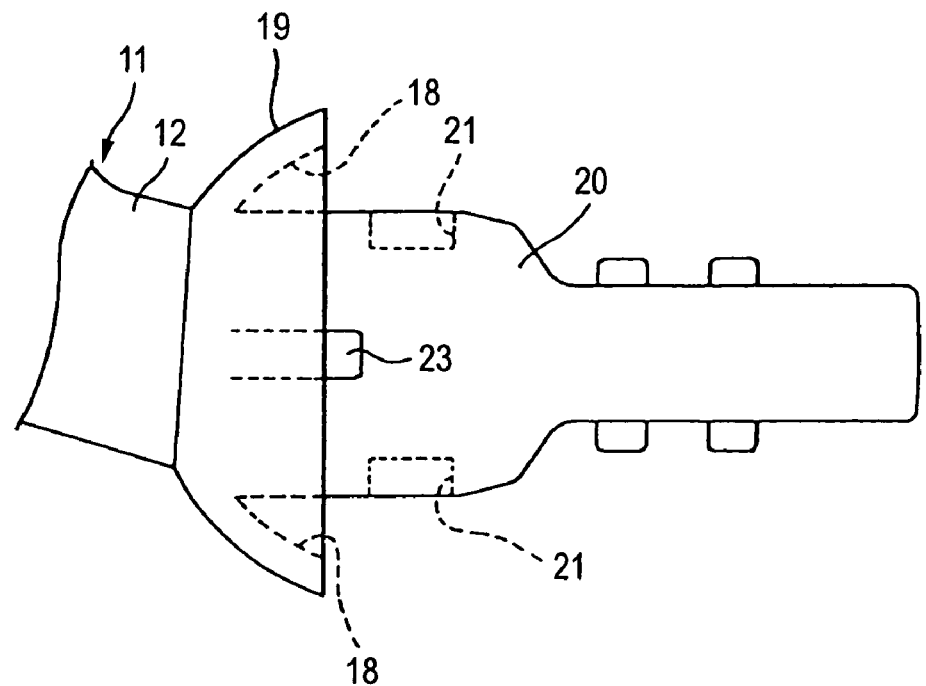
FIG. 3 is a plan view of the main portions of the above lever apparatus.

On the right side of the lever 11 which provides the base end portion of the lever upper 12, as shown in FIGS. 1 and 3 as well, there is formed a cover part 19 including a spherical-shaped outer surface and two thickness-reducing recessed portions 18 formed on the inner surface side thereof and, at the same time, on the two mutually opposing sides of a mounting part 20 which is provided on and projected from the interior of the cover part 19, there are formed two rotatably-supporting circular-shaped fitting recessed portions 21 in such a manner that they are respectively situated in the neighboring portions of the openings of the thickness-reducing recessed portions 18. In the lower portion of the cover part 19 of the lever upper 12, there is formed a cut-away portion 22. Also, on the upper surface side of the mounting part 20, there is provided a projecting portion 23 which extends so as to be continuous with the inner surface of the cover part 19. Further, on the portions of the thickness-reducing recessed portions 18 that respectively correspond to the side portions of the mounting part 20, there are disposed reinforcing ribs 24.

On the right end portion of the lever lower 13 serving as the base end portion thereof, there is disposed an auxiliary cover part 25 including a spherical-shaped outer surface; and, when the lever upper 12 and lever lower 13 are combined together, the auxiliary cover part 25 is fitted into the cut-away portion 22 and thus the outer surface of the auxiliary cover part 25 becomes continuous with the outer surface of the cover part 19.

On the other hand, the lever support member 26 is formed in a rectangular-shaped box and is also made of synthetic resin. The lever support member 26 is structured such that, in the surface thereof situated on the lever 11 side, there is formed an inserting opening 27, on the two mutually opposing sides thereof, there are respectively disposed rotating shaft portions 28 so as to project inwardly toward each other, and, in the peripheries of the two shaft portions 28, there are formed openings 29 respectively. Also, on the upper surface portion of the lever support member 26, there is provided a center shaft 30 so as to project upwardly and, on the lower surface portion thereof, there is provided an arc-shaped rib 31 so as to project downwardly.

Figure 4:
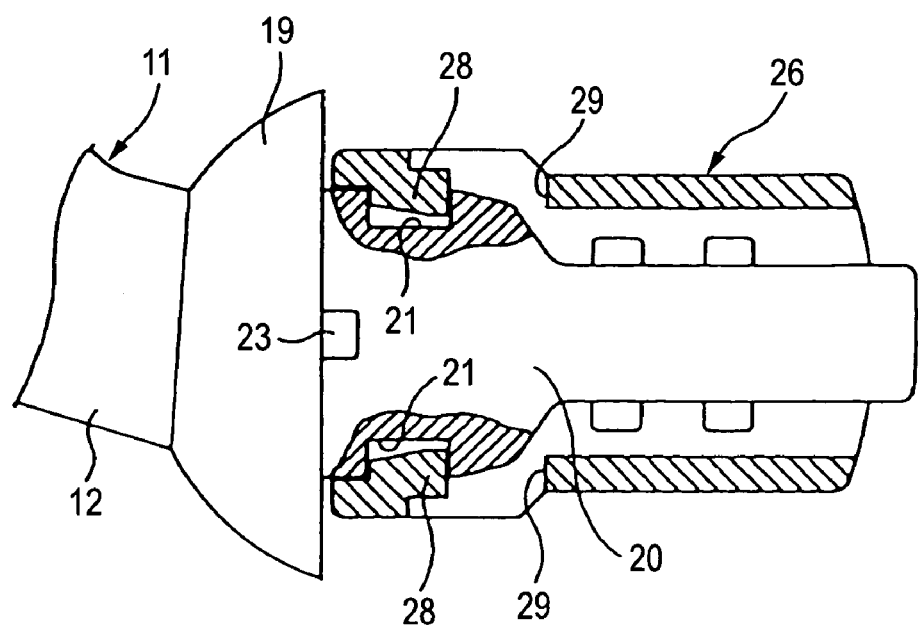
FIG. 4 is a section view of the main portions of the lever apparatus, showing a state thereof in which the lever and lever support member are fitted with each other.

In the case of the lever 11 structured by combining the lever upper 12 and lever lower 13 with each other, in case where the mounting part 20 situated on the base end portion side thereof is inserted into the inserting opening 27 of the lever support member 26 and, as shown in FIG. 4, the two fitting recessed portions 21 are respectively fitted with their corresponding shaft portions 28, the lever 11 can be rotatably mounted on the peripheries of the shaft portions 28 of the lever support member 26. Also, the lever 11 is mounted through the lever support member 26 on the steering column portion of a vehicle; and thus, in case where the lever 11 is rotated around the rotation shaft 30 of the lever support member 26, the lever 11 can be rotated around the rotation shaft 30 together with the lever support member 26.

Figure 5:
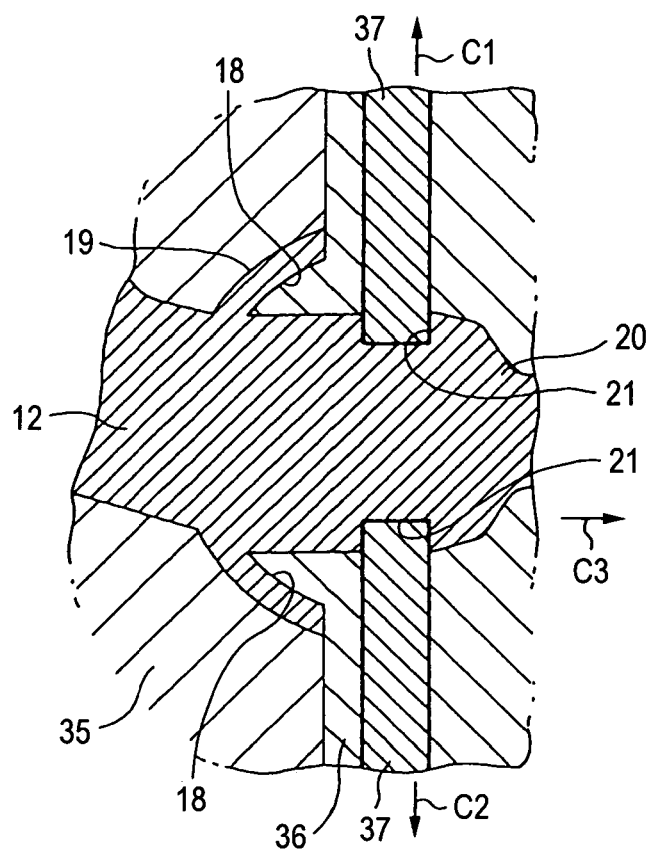
FIG. 5 is a section view of a mold structure for molding the base end portion of the lever; and, FIG. 6 corresponds to FIG. 3 and is a plan view of a conventional lever apparatus shown as a comparison example.
Figure 6:
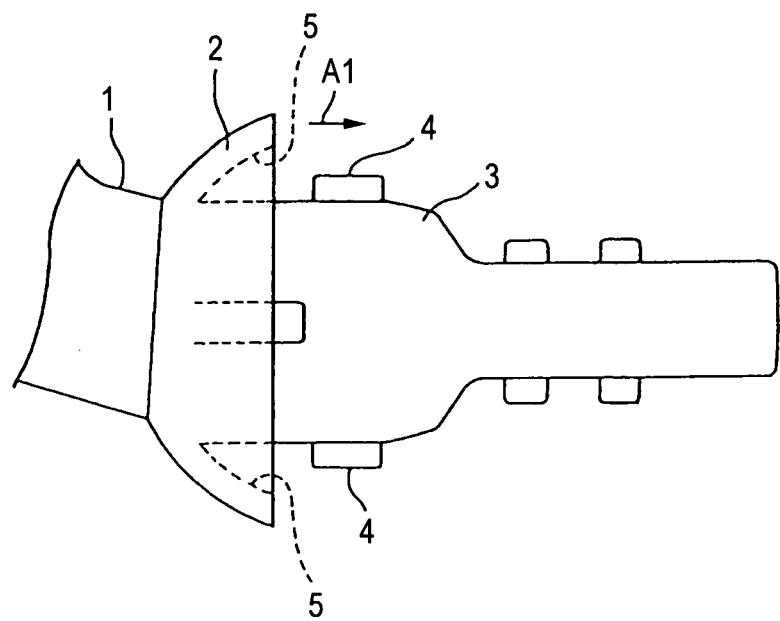

Here, the base end portion of the lever upper 12 is molded using such a mold structure shown in FIG. 5. That is, FIG. 5 shows a molding mold 35 which is used to mold the outer surface side portion of the cover part 19, a molding mold 36 used to mold the thickness-reducing recessed portions 18 and mounting portion 20 of the cover part 19, and liner molds 37, 37 respectively for molding the fitting recessed portions 21 of the cover part 19. When opening the molds, the molding mold 35 is moved, for example, in the direction where it is moved away upwardly from the surface of the sheet of FIG. 5. Also, the molding mold 36 is structured such that, after the liner molds 37, 37 are slided respectively in the arrow marks. C1, C2 directions and are thereby retreated from their associated fitting recessed portions 21, the mold 36 is slided in the arrow mark C3 direction. With use of this mold structure, the base end portion of the lever upper 12 can be molded.

According to the above-mentioned embodiment, there can be obtained the following effects. That is, while the cover part 19 including a spherical-shaped outer surface and two thickness-reducing recessed portions 18 on the inner surface side thereof is disposed on the base end portion of the lever upper 12 of the lever 11, instead of the rotatably-supporting shaft portions which are formed in the conventional lever apparatus, the fitting recessed portions 21 are formed in the mounting part 20 of the lever upper 12. Thanks to this structure, in the neighboring portions of the openings of the thickness-reducing recessed portions 18, there are not any obstacles which can hinder the sliding motion of the molding mold 36 for molding the thickness-reducing recessed portions 18. Therefore, when molding the lever upper 12, the molding mold 36 for molding the thickness-reducing recessed portions 18 can be slided in the projecting direction (in the arrow mark C direction) of the mounting part 20, which can facilitate the manufacture of the lever upper 12 and thus the lever 11.

Also, since, in the lever support member 26, the openings 29 are respectively formed in the peripheries of their associated rotatably-supporting shaft portions 28, when the fitting recessed portions 21 of the lever 11 are fitted with the shaft portions 28 of the lever support member 26, the shaft portions 28 can be made easy to be elastically deformed. Due to this, the shaft portions 28 and the peripheral portions of the shaft portions 28 can be prevented against breakage as much as possible.

As can be clearly understood from the foregoing description, according to the invention, while the cover part including a spherical-shaped outer surface and two thickness-reducing recessed portions on the inner surface side thereof is disposed on the base end portion of the lever, the fitting recessed portions, instead of the rotatably supporting shaft portions which are formed in the conventional lever apparatus, are formed in the mounting part of the lever. Thanks to this structure, the molding operation of the base end portion of the lever can be facilitated, which makes it possible to manufacture the lever.

What is claimed is:

1. A lever apparatus for a vehicle comprising:
   a lever;
   a cover part disposed on a base end portion of the lever, which includes a spherical-shaped outer surface and a thickness-reducing recessed portion formed on an inner surface side thereof;
   a mounting part fixedly projecting from the inner surface of the cover part, the mounting part and the lever formed monolithically;
   a pair of fitting recessed portions formed in opposed side portions of the mounting part outside of the cover part; and
   a lever support portion including a pair of shaft portions with which the pair of fitting recessed portions are respectively fitted such that the lever is pivotably connected to the lever support portion,
   wherein the thickness-reducing recessed portion of the cover part includes reinforcing ribs.

2. The lever apparatus according to claim 1, wherein a pair of openings are respectively formed in peripheries of the associated shaft portions.

3. The lever apparatus according to claim 2, wherein an inserting opening to which the mounting part is inserted is formed in the lever support portion, and the pair of shaft portions project toward the inserting opening.

4. The lever apparatus according to claim 3, wherein the lever support portion is configured such that when the mounting part is inserted into the lever support portion, the pair of shaft portions abut to the mounting part and wherein the shaft portions are able to be elastically deformed.

* * * * *